United States Patent [19]

Moore

[11] 4,185,195
[45] Jan. 22, 1980

[54] CONSTRUCTION OF COLLIMATORS AND/OR DETECTORS FOR PENETRATING RADIATION

[75] Inventor: John F. Moore, Lake Bluff, Ill.

[73] Assignee: EMI Limited, Hayes, England

[21] Appl. No.: 865,879

[22] Filed: Dec. 30, 1977

[51] Int. Cl.² ............................................. G01T 1/20
[52] U.S. Cl. ................................. 250/361 R; 250/505
[58] Field of Search ................... 250/361, 362, 363 S, 250/367, 485, 486, 487, 505, 445 T

[56] References Cited

U.S. PATENT DOCUMENTS

| | | | |
|---|---|---|---|
| 2,731,713 | 1/1956 | Schaefer | 250/505 |
| 2,760,077 | 8/1956 | Longini | 250/505 |
| 2,829,264 | 4/1958 | Garrison | 250/361 R |
| 3,225,193 | 12/1965 | Hilton et al. | 250/367 |
| 3,983,398 | 9/1976 | Boyd | 250/445 T |

FOREIGN PATENT DOCUMENTS

| | | |
|---|---|---|
| 1218096 | 1/1971 | United Kingdom . |
| 1343339 | 1/1974 | United Kingdom . |

*Primary Examiner*—Bruce C. Anderson
*Attorney, Agent, or Firm*—Cooper, Dunham, Clark, Griffin & Moran

[57] ABSTRACT

A method of constructing arrays of collimators and/or detectors for penetrating radiation is described. A tape or foil is wound alternatively over and under rods provided in upper and lower sets to define a plurality of substantially parallel or slightly inclined channels for the radiation. The channels can be filled with suitable plastics material.

11 Claims, 7 Drawing Figures

CONSTRUCTION OF COLLIMATORS AND/OR DETECTORS FOR PENETRATING RADIATION

The present invention relates to the construction of collimators and/or detectors for penetrating radiation, such as x-radiation. It has special, though not exclusive, application to the construction of substantially linear banks of collimators and/or detectors such as may be used, for example, in radiographic apparatus of the kind which has become known as computer-assisted tomographic (CAT) apparatus.

Description of CAT apparatus utilising arrays of both collimators and detectors can be found, inter alia, in U.S. Pat. Nos. 3,866,047; 3,881,110; 3,944,833 and 3,946,234.

It is an object of this invention to provide a method of constructing such arrays of collimators and/or detectors.

It is another object of this invention to provide a method by means of which arrays of collimators and/or detectors can be fabricated as a whole, rather than by the joining of individually fabricated components.

It is another object of this invention to provide a method of constructing detector arrays in which the material used for physically separating adjacent detectors is a reflector of light.

Figure 1:
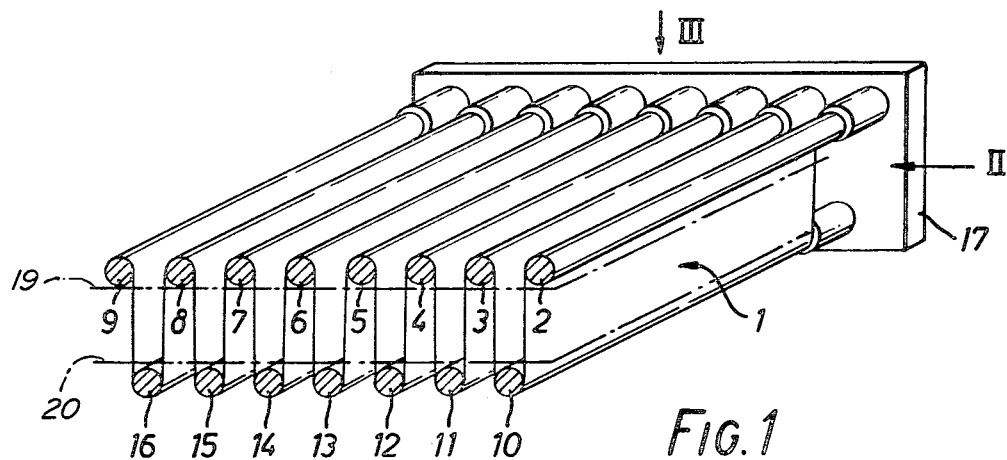
Figure 2:
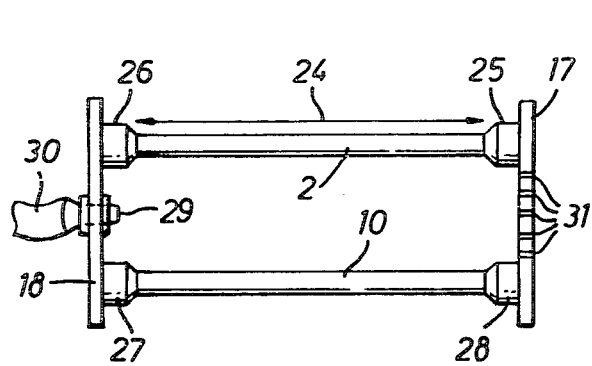
Figure 3:
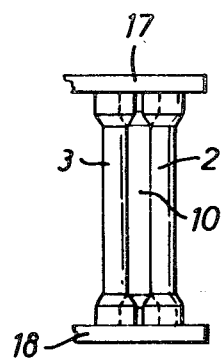
Figure 4:
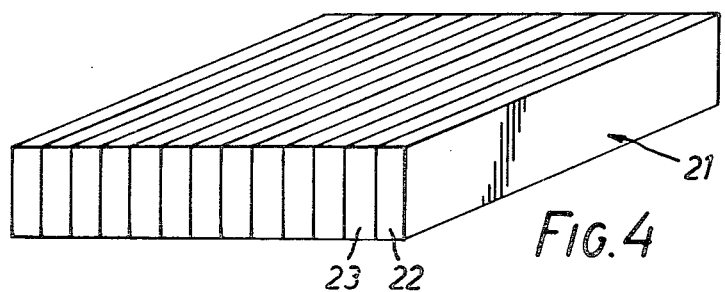
Figure 5A:
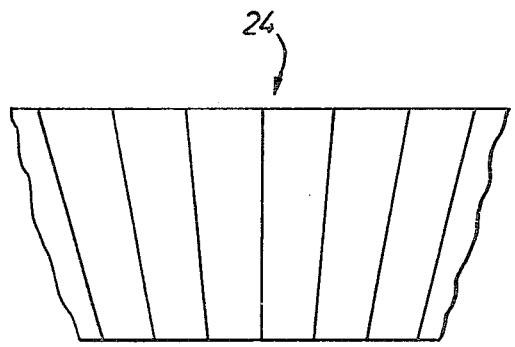
Figure 5B:
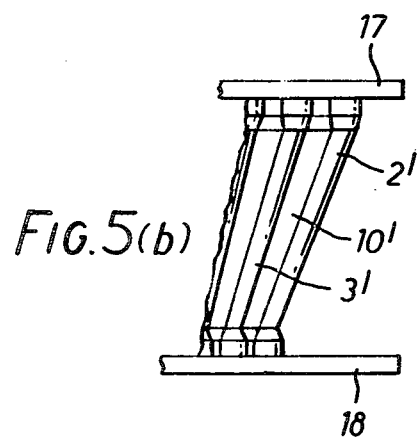
Figure 5C:
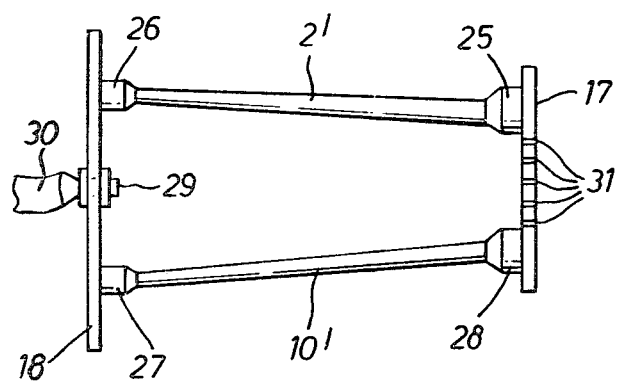

In order that the invention may be clearly understood and readily carried into effect, one embodiment thereof will now be described with reference to the accompanying drawings, of which:

FIG. 1 shows, in perspective view, a stage reached, in the construction of a detector array, after performing one of the steps of a method according to one example of this invention, FIG. 2 shows, in end view, from the direction of the arrow II, shown in FIG. 1, a jig used to construct the array, FIG. 3 shows in plan view (taken at the arrow II in FIG. 1) part of the jig shown in FIG. 2, FIG. 4 shows a finished detector array produced by a method in accordance with this invention, and FIGS. 5(a), 5(b) and 5(c) show, respectively, part of an array of mutually inclined collimators and/or detectors, and plan and end views respectively of part of a jig for use in forming such an array.

Referring now to FIG. 1, and considering the construction of an array of detectors, a tape 1, formed of or coated with x-ray absorbent material, is wound as shown around two sets of elongated, finger-like members (such as rods) 2-9 and 10-16 respectively, which are supported by a pair of end plates, of which only one plate, 17, is visible in FIG. 1, to form a winding jig.

One end of the tape 1 is welded or otherwise firmly secured to the rod 2 and, after winding has been completed, the other end of the tape 1 is likewise firmly secured to the rod 9. In the winding process, the tape is passed alternately under a rod of the lower set (10-16) and over a rod of the upper set (2-9) as shown, and moreover the tape 1 is held under tension to ensure that the tape assumes a vertical disposition between the rollers of the top and bottom sets over which it is successively wound.

When the winding stage is completed, as shown in FIG. 1, there are provided (in this example) thirteen parallel channels and, in accordance with one embodiment of the invention, a suitable plastic scintillator material is introduced into the channels. This can be achieved, for example, by injecting the plastic material through a nozzle formed in one of the end plates after having formed an effectively closed cavity by means of top and bottom plates placed respectively above the upper set of rods and below the bottom set of rods and side plates, extending between the end-plates, and parallel to the channels formed by the tape 1, to form the sides of the cavity.

Once the cavity has been formed, the material can be injected through the aforementioned nozzle and then allowed to set, or subjected to a curing operation as appropriate. Preferably at least those surfaces of the rod-supporting end plates, the upper and lower and side cavity closing plates, and the rods 2-16 with which the plastic material comes into contact are formed of such a material that the plastic does not adhere thereto to any substantial extent. Alternatively or additionally, the components specified at the beginning of this paragraph may be heated or cooled at appropriate stages in the process to ensure easy removal of the plastics material therefrom.

Once the plastic has set or cured, the cavity forming upper and lower and side plates are removed and the assembly is cut along the lines 19 and 20 to produce a detector array 21 (FIG. 4). One or both of the rod-supporting end plates such as 17 may be removable to allow the cutting to be carried out. In the detector array 21, successive channels of plastic (e.g. 22 and 23) are separated by a layer of x-ray absorbent material constituted by a portion of the tape 1.

The tape 1 can conveniently comprise a thin ribbon of x-ray absorbing metal, for example tantalum, which is preferably polished to provide surfaces which are reflective of the light generated in the plastic scintillator material in response to the incidence thereon of x-rays. Alternatively the tape may be a flexible plastics tape, such as that known as Mylar, coated on one or both sides with an x-ray absorbent material.

Some details of the winding jig are shown in FIGS. 2 and 3 in which components common to FIG. 1 carry the same reference numbers. In FIG. 2, which is a side view on the arrow II of FIG. 1, both end plates can be seen. The one which was not visible in FIG. 1 carries the reference number 18. It can be seen that the rods, such as 2 and 10, are of uniform cross section over the greater part of their length, as indicated by the arrow 24, which corresponds to the width of the tape 1 (FIG. 1). In order that the winding can proceed with the tape under tension without damaging the edges thereof, the rods are formed with, or secured inside, tapered collars such as shown at 25 and 26 for rod 2 and 27 and 28 for rod 10. This expedient also eases the winding process because the tape tends to be self-centering.

A nozzle 29 is shown passing through the end-plate 18. This nozzle is connected by a pipe 30 to a pressurised source (not shown) of the plastics material referred to earlier. The opposite end plate 17 is formed with apertures (indicated schematically at 31) which are used to enable air to escape from the cavity which is closed, during the injection process, as described previously. A set of apertures such as 31 is associated with each of the aforementione channels formed by the wound tape and the apertures also serve to indicate when the channels are properly filled with the plastic material. This indication can be obtained by visual inspection or by pressure sensitive electrical switches disposed in or adjacent the apertures.

FIG. 3 shows a top view of part of the jig, on arrow III of FIG. 1, and shows the rods 2 and 3 of the top set partly overlying rod 10 of the bottom set.

In the event that it is desired to manufacture a collimator array instead of a detector array, the step of injecting plastic scintillator material into the channels is not necessary. The channels may, if desired, be left as they are (containing air) provided that a suitable support is constructed to hold all of the rods 2-16 in their appropriate positions while not obstructing the passage of x-rays along the channels. It is preferable, however, for a non-scintillating, non x-ray absorbent plastics material to be introduced into the collimator channels so that the array can be cut from the jig to take the same form as detector array shown in FIG. 4.

Although injection of plastics material, both into collimators and detector arrays, has been described, the invention is not limited to the way in which such material is introduced and other suitable techniques known to those skilled in the art of casting plastic may be used if desired without departing from the scope of the invention. It has already been pointed out, indeed, that the plastic material need not be used at all in the case of a collimator array.

It can be advantageous, especially in the case of a collimator array, for the channels formed by the tape to be convergent on a common point (e.g. the x-ray source of a CAT apparatus) rather than being parallel. Part of such an array is shown in plan view at 24 in FIG. 5(a). In order to form an array such as 24, the upper and lower sets of rods have to be tapered as shown in the plan view of FIG. 5(b) which is similar to the view of FIG. 3. Similar components in FIGS. 3 and 5(b) are identified by the same reference numbers in each case except that the tapered rods in FIG. 5(b) have primed reference numbers. In FIG. 5(b) the taper of the rods is exaggerated for the purposes of illustration.

In order to equalise the paths followed by the tape at the two ends of the rods (bearing in mind the taper shown in FIG. 5(b)) so that the tape can be wound without wrinkling or otherwise distorting it is necessary for the rods of the lower set to diverge from those of the upper set, in a direction perpendicular to the plane of the paper in FIG. 5(b), so that the thinner ends of the rods of the two sets are farther apart than the fatter ends thereof. This divergence is shown on exaggerated scale in FIG. 5(c) which represents a view similar to that of FIG. 2. Similar components in FIGS. 2 and 5(c) are identified by the same reference numbers in each case, except that the reference numbers applied to the tapered rods in FIG. 5(c) are primed.

It will be appreciated that a combined collimator/detector array could be produced by placing one or two suitable separators parallel to the support plates 17 and 18 at appropriate places along the rods 2-16 and introducing plastic scintillator material into the channels lying to one side of the separators and non-scintillating plastics material into the channels to the other side of the separators. When the separators are removed, a solid, combined collimator and detector array is produced.

The separators can conveniently comprise comb-like members, one of which has teeth which can be pushed down into the channels which open upwards (relating to FIG. 1) and the other of which has teeth which can be pushed upwards into the channels which open downwards.

Arrays of collimators and/or detectors formed in accordance with the invention are rugged, accurate and cheap. They also enable channels to be extremely close together, which is advantageous from the point of view of making the best use of radiation dosage administered to a patient.

Conveniently, where the plastics material comprises an x-ray sensitive scintillator material, a plastic loaded with rare earth material, such as Gadolinium oxy-sulphate, can be used.

What I claim is:

1. A method of constructing a multi-channel array of collimators and/or detectors for penetrating radiation, said channels being substantially side-by-side and extending in the same general direction, the method including the step of forming said channels by tensioning and winding a tape containing material which attenuates said radiation on a winding support including first and second sets of elongated finger members extending in a first direction, substantially parallel to the direction in which said channels extend, the members of a set being spaced apart in a second direction, transverse of said first direction and the sets being spaced apart in a third direction, substantially orthogonal to both said first and second directions; said tape being wound alternately over an elongated member of one set and under an elongated member of the other set and progressing along the members of both sets as winding proceeds, and the method further including the steps of rendering the array self-supporting and thereafter removing the array from the winding support.

2. A method according to claim 1 wherein the step of rendering the array self-supporting includes the step of filling said channels with a plastics material.

3. A method according to claim 2 wherein said plastics material comprises an x-ray sensitive scintillator material.

4. A method according to claim 2 wherein said step of filling is effected by injection of said plastics material into a closed cavity containing the tape as wound on said winding support.

5. A method according to claim 4 wherein said plastics material comprises an x-ray sensitive scintillator material.

6. A method according to claim 1, wherein said step of removing the array from the winding support includes the step of cutting said array in respective planes, spaced apart in said third direction, said planes being closer together than said sets.

7. A method according to claim 1 wherein all of said elongated members are parallel.

8. A method according to claim 1 wherein the elongated members of each set are tapered in the same sense and also mutually inclined to one another in said second direction, and the sets of elongated members are inclined to one another in said third direction with the thinner ends of said elongated members farther apart, in said third direction, than the fatter ends of said elongated members.

9. A method according to claim 1 in which the elongated members of one of said sets overly gaps between the elongated members of the other set.

10. A method according to claim 1 wherein the step of rendering the array self-supporting is effected by inserting divider means into said channels at a given position along their length, filling the part of said channels to one side of said divider means with non-scintillating plastics material, filling the part of said channels to the other side of said divider means with X-ray sensitive scintillating plastics material and, after the plastics materials have cured, removing said divider means.

11. A method of constructing a multi-channel array of collimators and/or detectors for penetrating radiation, including the step of forming said channels by winding a tape, containing material which attenuates said radiation, on a winding support comprising first and second sets of elongated members arranged in substantially overlying relationship and extending in a direction substantially parallel to the direction of said channels, said tape being wound alternately over an elongated member of one set and under an elongated member of said first set and progressing along said sets as winding proceeds, and the method further including the steps of rendering the array self-supporting and thereafter removing the array from the winding support.

* * * * *